A. H. NEULAND.
APPARATUS FOR TRANSMITTING POWER.
APPLICATION FILED MAR. 22, 1913.

1,171,351.

Patented Feb. 8, 1916.
7 SHEETS—SHEET 1.

WITNESSES:
H. G. Prost.
J. B. Gardner

INVENTOR
A. H. NEULAND
BY Miller & White
his ATTORNEYS.

A. H. NEULAND.
APPARATUS FOR TRANSMITTING POWER.
APPLICATION FILED MAR. 22, 1913.

1,171,351.

Patented Feb. 8, 1916.
7 SHEETS—SHEET 2.

WITNESSES:
J. B. Gardner
H. G. Prost

INVENTOR
ALFONS-H-NEULAND

BY
Miller & White
HIS ATTORNEYS.

UNITED STATES PATENT OFFICE.

ALFONS H. NEULAND, OF SAN FRANCISCO, CALIFORNIA, ASSIGNOR TO NEULAND ELECTRICAL COMPANY, INC., A CORPORATION OF NEW YORK.

APPARATUS FOR TRANSMITTING POWER.

1,171,351. Specification of Letters Patent. Patented Feb. 8, 1916.

Application filed March 22, 1913. Serial No. 756,162.

*To all whom it may concern:*

Be it known that I, ALFONS H. NEULAND, a subject of the Czar of Russia, and a resident of the city and county of San Francisco, State of California, have invented certain new and useful Improvements in Apparatus for Transmitting Power, of which the following is a specification.

The invention relates to a method of and apparatus for transmitting power and particularly to a method of and apparatus for transmitting power between two rotatable elements or shafts which are adapted to rotate at the same or different speeds and in the same or different directions.

The object of the invention is to provide a method of and apparatus for coupling two shafts or rotatable elements together without the employment of any mechanical or tangible means connecting said shafts.

Another object of the invention is to provide a method of and apparatus for coupling together two shafts adapted to rotate in opposite or in the same direction without the employment of any mechanical or tangible means connecting said shafts.

Another object of the invention is to provide a method of and apparatus for connecting two shafts together magnetically or electro-magnetically.

Another object of the invention is to provide a magnetic or electro-magnetic coupling for two shafts which is adjustable so that the shafts will rotate in the same or opposite directions.

Another object of the invention is to provide a magnetic or electro-magnetic coupling which is of unitary construction, efficient of operation and relatively cheap of construction.

The invention possesses many other objects and advantageous features, which, with the foregoing, will be set forth at length in the following description, where I shall outline in full, the construction and operation of those forms of the invention which I have selected for illustration in the drawings accompanying and forming part of the present specification. The apparatus of the invention is capable of many modifications, several of which are shown in the aforesaid drawings. The novelty of the invention will be included in the claims succeeding said description. From this it will be apparent that I do not limit myself to the showing made by said drawings and description, as I may adopt many variations of my invention as expressed in said claims.

The apparatus of my invention is capable of a multiplicity of uses, several of which will be hereinafter enumerated. It may be employed to couple together two alined shafts which are to rotate in the same or opposite directions at the same or different speeds. It may be employed to couple together two parallel shafts which are to rotate in the same or opposite directions at the same or different speeds. It may be employed to couple together any two adjacent shafts, regardless of their direction with respect to each other, which are to rotate in the same or opposite directions at the same or different speeds. It may be employed to couple together two shafts which normally rotate at the same speed, but which at times rotate at different speeds. It may be employed to couple together two shafts which at times are to be rotated in the same direction and at times in opposite directions.

Heretofore, as far as I am aware, when it has been desirable to couple together two shafts by magnetic electric or electro-magnetic means, it has been the practice to connect to the prime mover, or driving shaft, a polyphase generator having a certain number of poles, and to provide the driven shaft with a polyphase motor, having the same or a different number of poles, which motor is fed by the generator, thereby causing the driven shaft to rotate at the same or a different speed. By the use of my invention all of the possible differences in speed are obtained by the employment of a unitary apparatus of small and simple construction, which operates with a high efficiency.

In the drawings accompanying this specification.

The apparatus may be employed to transmit power from a driving shaft or rotatable member to a driven shaft or rotatable member, and may be constructed to cause the driven shaft to rotate at the same speed as the driving shaft, or at a higher or lower speed than the driving shaft. For the purposes of description, I have illustrated the apparatus as constructed to operate as a speed reducing gear, that is, as an apparatus in which the driven shaft rotates at a slower speed than the driving shaft. In order to obtain a speed increasing gear, the designations of the driving and driven shafts are interchanged. I have not illustrated the apparatus in the form in which both shafts will revolve at the same speed, since such construction will be apparent from the drawings and description herein.

The apparatus consists broadly of two rotating elements having one or more stationary elements arranged between the surfaces thereof. The rotating elements consist preferably of circular elements in the form of cylinders or disks, one of which elements is connected or attached to the driving shaft and the other to the driven shaft. The various elements of the apparatus are preferably formed of laminations in accordance with the general practice.

Figure 1:
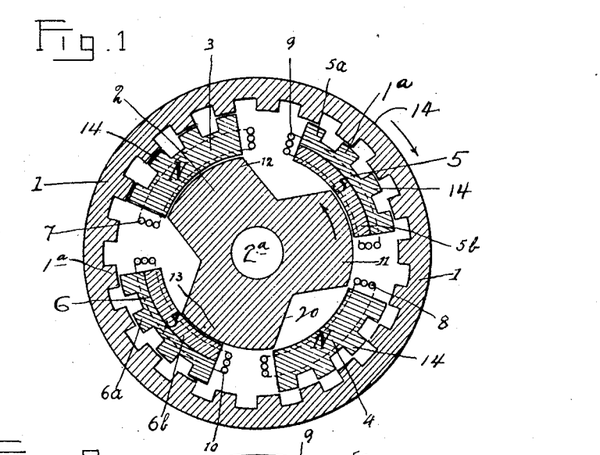
Figure 1 is a transverse section of one form of the apparatus, showing the parts arranged to cause a rotation of the driving and driven elements in opposite directions at different speeds.
Figure 2:
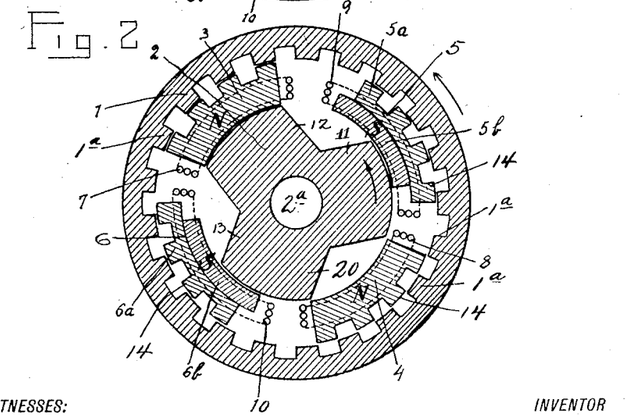
Fig. 2 is a transverse section of the same form of apparatus showing the parts arranged to cause rotation of the driving and driven elements in the same direction at different speeds.
Figure 3:
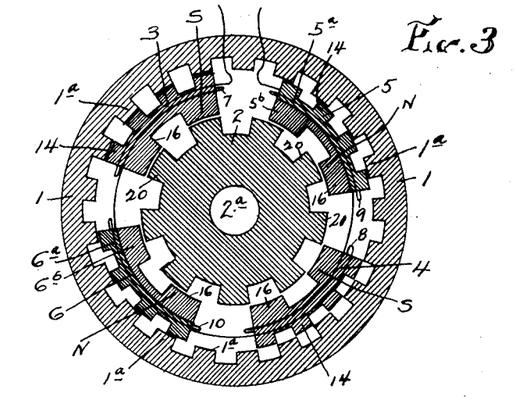
Fig. 3 is a transverse section similar to that shown in Fig. 1, in which the ratio of the speeds of driving and driven shafts is smaller.
Figure 4:
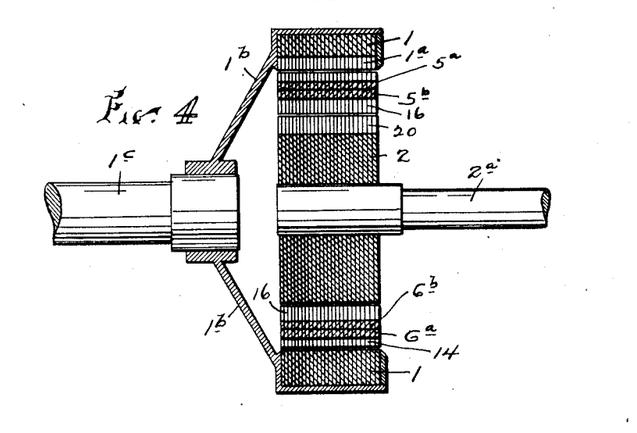
Fig. 4 is a longitudinal section of the apparatus shown in Fig. 3.

The constructions shown in Figs. 1 to 4 inclusive are believed to be the most readily understandable and will be described in detail first. As shown in these drawings, the apparatus consists of a drum or cylinder 1 provided on its inner face with a plurality of regularly spaced teeth or projections 1ª, preferably formed integrally with the cylinder. The cylinder is supported upon or in a suitable frame 1ᵇ which is attached to a shaft or other rotatable element 1ᶜ. The manner of mounting and securing the various parts of the apparatus is not shown in detail for the reason that various forms will readily suggest themselves to persons familiar with electrical or mechanical arts. Within the cylinder or drum 1 is a core 2, preferably formed of laminations, which is provided on its outer face with a plurality of teeth or projections 20, in the present embodiment shown in Figs. 1 and 2 there being three, designated respectively 11, 12 and 13. The core 2 is mounted upon or attached to a shaft or other rotatable element 2ª, the axis of which is alined with the axis of the rotatable element attached to the drum 1. The outer faces of the teeth 11, 12 and 13, and the inner faces of the teeth 1ª on the drum are concentric with the axis of revolution of the drum and core. Arranged between the projections 11, 12 and 13 and the teeth 1ª are a plurality of relatively stationary cores 3, 4, 5 and 6, the inner faces of which in Figs. 1 and 2 are of substantially the same length and curvature as the outer faces of the projections 11, 12 and 13, and the outer faces of which are provided with a plurality of teeth or projections 14 of substantially the same size and pitch as the teeth 1ª on the drum. The number of these cores may be varied so long as the proper spacing and relation between the projections on the cores and those on the rotating elements is maintained. In the present construction I have shown three projections on core 2 and four stationary cores, but in large sized units it is desirable to employ eight stationary cores in order that there may be an equal turning effect on opposite sides of the shaft. These cores are spaced apart, along the curve of their inner faces, a distance equal to substantially one-half the width of one of the projections 11, 12 and 13. When the projections or teeth 14 on the outer face of the core 3 coincide with the projections or teeth 1ª on the rotatable drum 1, the projections 14 on the outer faces of the cores 5 and 6 are partly offset with relation to the teeth 1ª, and the projections 14 on core 4 are staggered with relation to the teeth 1ª. Surrounding the stationary cores 3, 4, 5 and 6 are magnetizing windings 7, 8, 9 and 10, each surrounding their respective cores, and so connected that the inner parts of cores 3 and 4 become poles of one polarity, such as positive poles indicated by N, and the inner parts of cores 5 and 6 become poles of the opposite polarity or negative poles, indicated by S. The outer faces of the cores are, of course, of the opposite polarity from the inner faces. The cores are arranged so that the area of the magnetic circuit between the inner faces of the cores and the projections on the driving element is always constant, and the area of the magnetic circuit between the outer faces or projections on the cores and the teeth on the driven element is always constant. The current in the magnetic windings is, therefore, constant and the total flux is constant, but as the apparatus operates the path or paths of the magnetic flux is constantly shifted. Instead of providing the stationary cores with magnetizing windings, the cores may be formed as permanent magnets when the power to be transmitted is not great. It is not necessary that all of the cores be magnetized or provided with magnetizing windings, it being necessary only that the cores of one polarity either the north or the south poles, be magnetized. I will assume that core 2 is attached to the driving element and cylinder 1 is attached to the driven element, and that the core is rotating in the direction indicated by the arrow, and that the proper magnetic conditions obtain in the stationary cores. The rotation of the drum 1, upon the rotation of the member $2^a$, results in the following manner: With the members 1 and $2^a$ in the position shown in Fig. 1, there is no tendency for the drum 1 to rotate, since the forces acting thereon are in equilibrium. Now, assume member $2^a$ to have moved, in a counter-clockwise direction, a small amount. With member $2^a$ in the new position, the reluctance through core 3 and pole 12 will have increased, that through core 6 and pole 13 will have increased, that through core 4 and pole 13 will have decreased, and that through core 5 and pole 11 will have decreased, hence the flux through cores 3 and 6, tending to prevent rotation of drum 1 will have decreased, while the flux through cores 4 and 5 tending to cause the rotation of the drum 1 will have increased, with the result that the balance of forces acting upon drum 1 has been destroyed and it will have moved in a clockwise direction to a new position. The continuous rotation of core 2 will, therefore, cause a continuous rotation of the drum 1, the relative rates of rotation of the two parts depending on the number of teeth on the core 2 and the number of teeth on the drum 1. In the present instance there are three teeth on the core 2 and twenty-one upon drum 1, thereby causing the drum to complete one revolution for every seven revolutions of the core 2. If the drum 1 were attached to the driving element, the core 2 would complete seven revolutions for one revolution of the drum. The arrangement of the cores 3, 4, 5 and 6 in Fig. 1 causes the rotating parts to rotate in opposite directions, but the apparatus may be constructed so that the two parts will rotate in the same direction, or so that the direction of rotation may be varied at will. In Fig. 2, the parts are shown in such position that the rotating parts revolve in the same direction. In order to accomplish this, the teeth 14 on the cores representing like poles, in this instance cores 5 and 6, are moved in a direction opposite to the direction of rotation of the core 2, a distance equal to one-half the pitch of the teeth, while the inner faces of the cores remain in the same relation to each other. By thus moving the teeth 14 on cores 5 and 6 or by forming them originally as shown in Fig. 2, the pull exerted between the teeth 14 and the teeth $1^a$ is in the same direction as the direction of rotation of the core 2. In order that the apparatus may be used to reverse the direction of rotation of the driven element when desired, I prefer to construct the apparatus so that the teeth 14 on the cores 5 and 6 representing like poles, may be readily moved in the proper direction a distance equal to substantially one-half the pitch of the teeth 14 or $1^a$. This is accomplished in the present construction by dividing each of the cores 5 and 6 into two parts $5^a$—$5^b$, and $6^a$—$6^b$, respectively, at a plane concentric with the center of rotation. The parts $5^b$ and $6^b$ which complete the magnetic circuit with the projections 11, 12, 13, are fixed, and the parts $5^a$ and $6^a$ on which occur the teeth 14 are movable in the concentric plane for a limited distance. When it is desired to obtain small differences in speed between the two shafts or rotating elements and great power, the inner surfaces of the cores 3, 4, 5 and 6 may be provided with teeth or projections 16 and the projections 10 on the rotating core 2 increased in number, the pitch of the teeth on the core 2 depending upon the pitch of the teeth 16 on the inner faces of the cores 3, 4, 5, and 6. The same action will take place as explained hereinbefore, and the driven element will rotate a distance equal to the pitch of the teeth thereon when the driving element has rotated a distance equal to the pitch of the teeth thereon.

Figure 5:
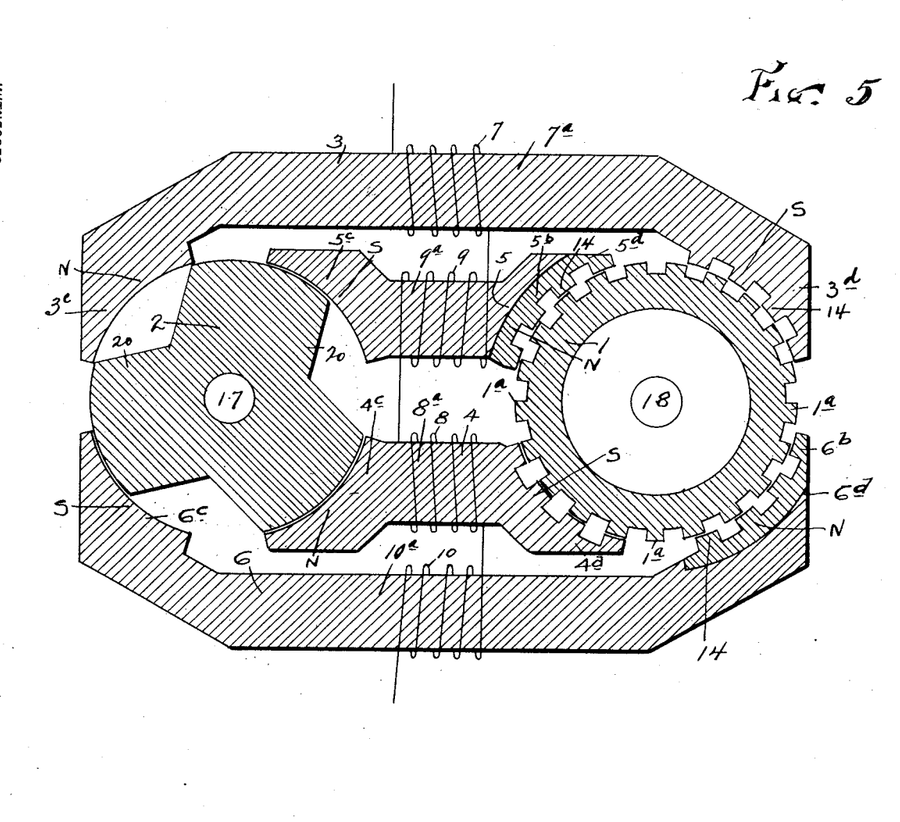
Fig. 5 is a modified form of apparatus for coupling together two non-alined shafts.

In Fig. 5 I have shown a modified form of the apparatus of my invention, which is adapted to transmit power between two non-alined shafts 17—18, which may be arranged parallel or at any desired angle to each other. The driving element or core 2 instead of being arranged concentrically within the driven element 1 is placed externally of and adjacent thereto, and the stationary cores, provided with their different formed surfaces (in instances where the rate of rotation of the two shafts are different) are arranged so that the opposite faces thereof lie adjacent the driving and driven elements respectively. The driven element 1 instead of being formed as a cylinder with teeth on the inner face thereof is formed as a core with the teeth on the periphery. The operation of this form of the apparatus is the same as the operation of those forms heretofore described. The stationary elements 3, 4, 5 and 6 may either consist of permanent magnets or may be provided with magnetizing windings 7, 8, 9 and 10 as shown. In this construction the poles $3^c$, $4^c$, $5^c$, $6^c$, of the stationary elements are arranged so that their surfaces are adjacent to and concentric with the driving element 2, and the poles $3^d$, $4^d$, $5^d$, $6^d$, are arranged so that they lie generally concentric with the driven element 1. In the construction shown in the four previous figures the two revolving elements lie close to each other so that the cores are short, but in the present construction, the poles of each core are separated from each other a greater distance. The poles $3^c$—$3^d$, $4^c$—$4^d$, $5^c$—$5^d$, and $6^c$—$6^d$, are joined to each other by the connecting links $7^a$—$8^a$—$9^a$—$10^a$ respectively upon which are arranged the respective magnetizing windings 7, 8, 9, and 10. The poles of one sign, lying adjacent the driven element, in this case poles $5^d$ and $6^d$, are provided with movable faces, as in the prior constructions, so that the direction of rotation of the driven element may be reversed. The connecting links $7^a$—$8^a$—$9^a$—$10^a$ may lie at right angles to the axes of rotation, or may be bent at any angle, depending upon the position of the shafts. The length of the connecting links depends upon the distance between the shafts and the size of the rotating elements.

Figures 6, 7, 8:
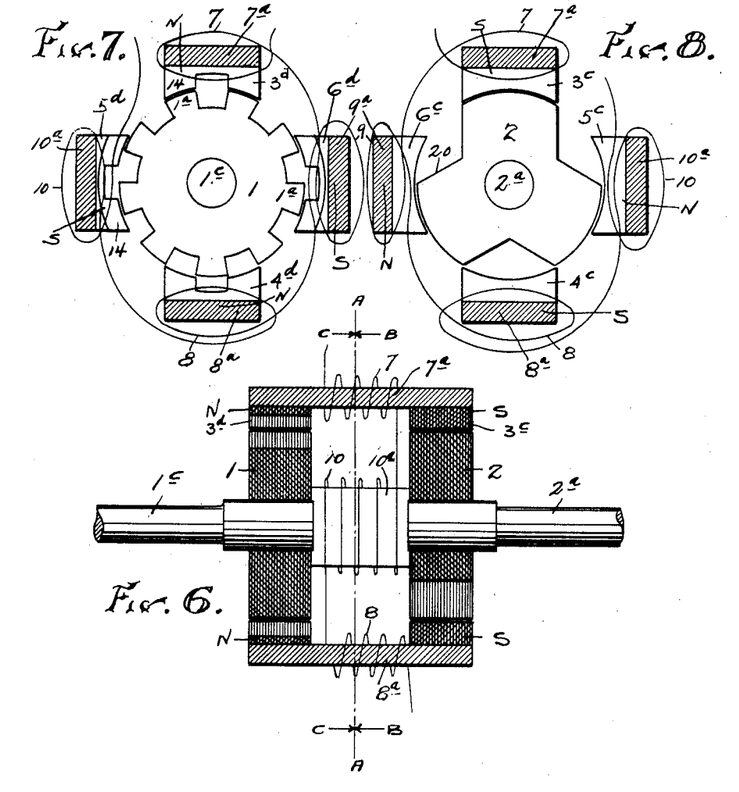
Fig. 6 is a longitudinal section of another form of the apparatus.
Fig. 7 is a cross section on the line A—A Fig. 6 looking in the direction of the arrow B.
Fig. 8 is a cross section on the line A—A Fig. 6 looking in the direction of the arrow C.

The modification shown in Figs. 6, 7 and 8, shows a construction somewhat similar to that shown in Fig. 5, with the shafts substantially alined, and with the stationary elements arranged on the outside or around the revolving elements. Each stationary element consists of two portions connected by a connecting link on which is arranged the magnetizing winding. It may be noted that in this construction, as in the other various modifications, that for the transference of small amounts of power, permanent magnets may be employed instead of electromagnets. The poles $3^c$, $4^c$, $5^c$ and $6^c$ are arranged adjacent to and concentric with the driving element, and the poles $3^d$, $4^d$, $5^d$, and $6^d$ are arranged adjacent to and concentric with the driven element, and the respective poles are connected by the connecting links $7^a$, $8^a$, $9^a$, $10^a$ of the magnetic circuit.

Figure 9:
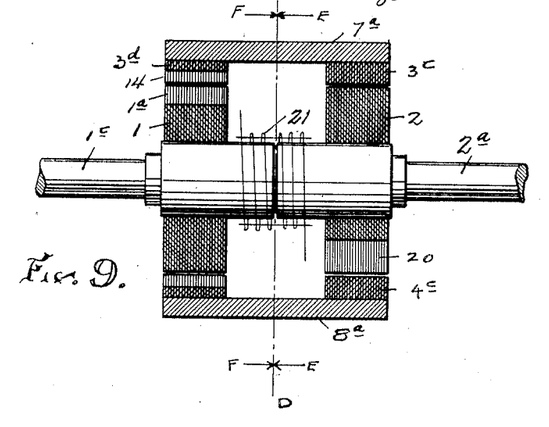
Fig. 9 is a longitudinal section of another form of the apparatus.
Figure 10:
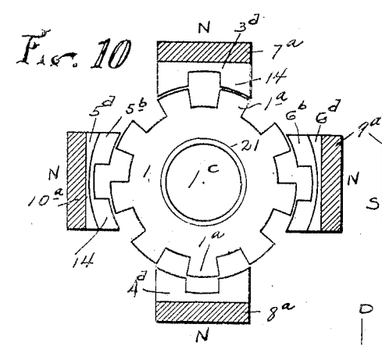
Fig. 10 is a cross section on the line D—D Fig. 9, looking in the direction of arrow E.
Figure 11:
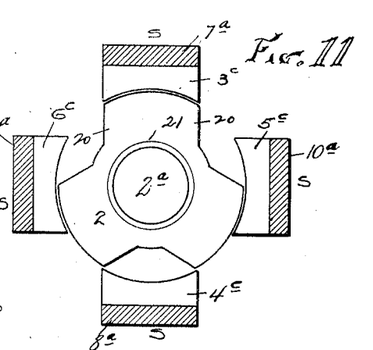
Fig. 11 is a cross section on the line D—D Fig. 9, looking in the direction of arrow F.

The modification shown in Figs. 9, 10 and 11 is similar to that of Figs. 6, 7 and 8, with the exception that the shafts are alined and are extended through the rotating elements so that they are very close together at their abutting ends. The magnetic flux is produced by an electric current flowing in the coil or winding 21 surrounding, spaced apart from, and supported independently of the extended shafts. This arrangement causes all of the poles at one revolving element to be of one polarity and all of the poles at the other element to be of opposite polarity. The operation of the apparatus in this instance is the same as has been heretofore described with relation to Figs. 1 and 2.

Figure 12:
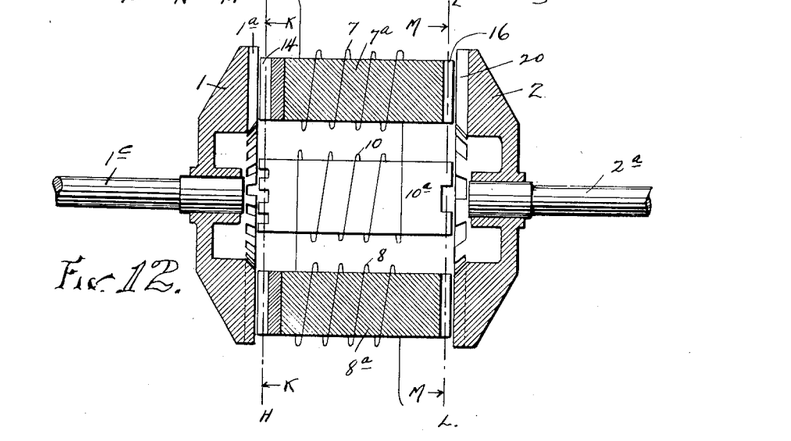
Fig. 12 is a longitudinal section of another form of the apparatus, showing the revolving elements formed in the shape of disks.
Figure 13:
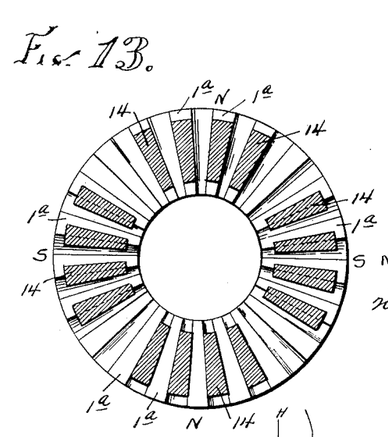
Fig. 13 is a cross section on line H—H Fig. 12, looking in the direction of arrow K.
Figure 14:
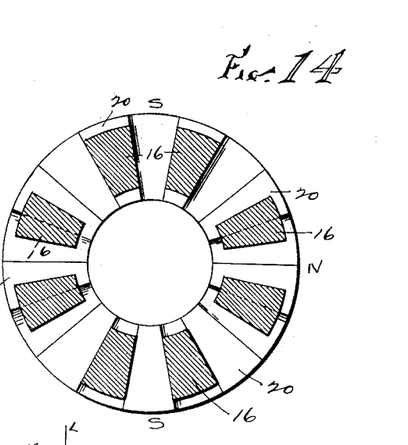
Fig. 14 is a cross section on the line L—L Fig. 12, looking in the direction of arrow M.

The modification shown in Figs. 12, 13 and 14 is similar to that shown in Figs. 6, 7, and 8 with the exception that the driving and driven elements 2 and 1 are formed in the shape of disks instead of cylinders, that is, the various teeth or projections are arranged on the side of the elements instead of on their peripheries. In this and the following construction the teeth on the revolving elements are made longer than the teeth on the stationary elements, so that the drawings may be more readily understood and for no other reason. The teeth on the revolving and stationary elements are tapered or wedge shaped on account of the varying diameter and the stationary elements are arranged between the revolving elements. The teeth on the stationary elements are correspondingly wedge shaped and the teeth are spaced apart in the same relation as in the other constructions.

Figure 15:
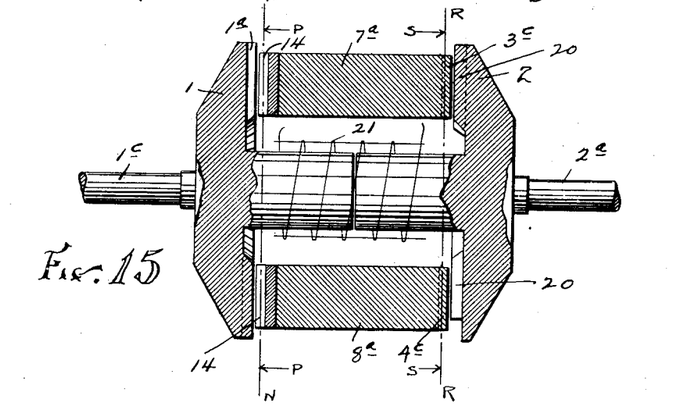
Fig. 15 is a longitudinal section of another form of the apparatus, similar to that shown in Fig. 12.
Figure 16:
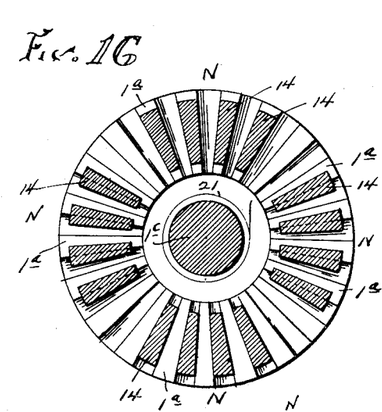
Fig. 16 is a cross section on the line N—N Fig. 15 looking in the direction of the arrow P.
Figure 17:
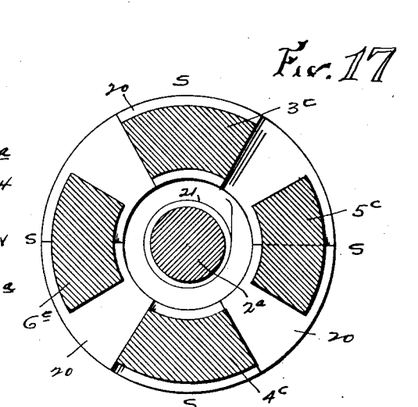
Fig. 17 is a cross section on the line R—R Fig. 15, looking in the direction of arrow S.

The modification shown in Figs. 15, 16 and 17 is similar to that shown in Figs. 9, 10 and 11 with the exception that the cylindrical rotating elements in Figs. 9, 10 and 11 have been developed into disks, and the stationary elements are arranged between the faces of the disks, instead of adjacent to the periphery of the cylinders. The shafts are extended through the disks, so that their ends lie very close together and the magnetizing winding 21 is arranged around the extended shafts, but is spaced apart therefrom and supported independently thereof, so that it remains stationary.

It will be appreciated that by a proper selection of the number of projections on the rotatable and stationary elements any desired speed ratio may be obtained. The number of stationary projections is not confined to any particular number, but may be varied depending upon the size of the apparatus or the power to be transmitted. The apparatus described is simple and compact in construction, contains at the most only a few coils which are stationary, operates with a high efficiency, and the direction or rotation of the driven element may be readily reversed.

The various modifications shown all operate in substantially the same manner and are illustrated to show several of the many possible constructions. It is evident that I do not intend to limit myself to any particular construction, but desire to claim the invention broadly.

I claim:

1. An electromagnetic power transmitting apparatus comprising a rotatable element provided on one of its faces with regular teeth, a second rotatable element provided on one of its faces with regular teeth, a stationary structure provided with two mutilated faces, one of said mutilated faces opposing the teeth of the first rotatable element, the other mutilated face opposing the teeth on the second rotatable element and a magnetizing winding on said stationary element producing a magnetic flux common to both rotating elements, said flux causing a rotation of one rotatable element to be accompanied by the synchronous rotation of the other.

2. An electro-magnetic power transmitting apparatus comprising a rotatable element provided on its face with a plurality of projections, a second rotatable element provided on its face with a plurality of projections, a plurality of stationary cores spaced apart circumferentially arranged between said rotatable elements, and means for producing a magnetic flux in said cores, substantially all of said flux traversing each of the rotatable elements.

3. An electro-magnetic power transmitting apparatus comprising a rotatable element, a plurality of projections of regular size and spacing on the face thereof, a second rotatable element, a plurality of projections of regular size and spacing on the outer face thereof, and a plurality of magnetic cores spaced apart circumferentially producing a magnetic circuit between said rotatable elements, the faces on one side of said cores corresponding to the teeth on the first element and the faces on the other side of said cores corresponding to the teeth on the second element.

4. An electro-magnetic power transmitting apparatus comprising a rotatable element provided on its face with regular projections, a second rotatable element provided on its face with a different number of regular projections, stationary cores having their opposite faces arranged adjacent said rotatable elements, said faces being spaced apart circumferentially a distance equal to substantially one-half the thickness of the projections on the second element, and magnetizing windings surrounding said cores.

5. An electro-magnetic power transmitting device comprising a rotatable element, a plurality of regular projections on the face thereof, a second rotatable element arranged adjacent thereto, a different number of regular projections on the face thereof, stationary cores having their opposite faces arranged adjacent said rotatable elements, said faces being spaced apart circumferentially a distance equal to one-half the thickness of the projections on the second element, the faces of the cores lying adjacent the second element corresponding to the faces of the projections on said element, and the other faces corresponding to the face of the first element and magnetizing windings surrounding said cores.

6. An electro-magnetic power transmitting apparatus comprising a rotatable cylinder, a plurality of regular projections on the inner face thereof, a rotatable element arranged within said cylinder, concentric therewith and spaced apart therefrom, a different number of regular projections on the outer face thereof, a plurality of normally stationary cores arranged between said rotatable elements and spaced apart transversely, the inner faces of said cores being of substantially the same curvature and length as the outer faces of the projections on the inner element, a plurality of projections on the outer faces of said cores of the same size as the projections on the cylinder, and magnetizing windings surrounding said cores.

7. An electro-magnetic power transmitting apparatus comprising a rotatable cylinder, a plurality of regularly spaced projections on the inner face thereof, a rotatable element arranged concentrically within said cylinder and spaced apart therefrom, a different number of projections on the outer face thereof, a plurality of normally fixed cores spaced apart circumferentially arranged between said rotatable elements, a plurality of projections on the outer face of each core of the same size and spacing as the projections on the cylinder, the projections on the cores being so placed with relation to the projections on the cylinder that when the projections on one core are alined with the projections on the cylinder, the projections on the opposite core are staggered with relation to the projections on the cylinder, and magnetizing windings surrounding said cores.

8. An electro-magnetic power transmitting apparatus comprising a rotatable element, a second rotatable element arranged adjacent thereto, a plurality of cores arranged between the two elements, and means for varying the direction of rotation of one of said members without varying the direction of rotation of the other.

9. An electro-magnetic apparatus for coupling together two elements so that they rotate at different speeds, comprising an annular rotatable element provided on its inner face with a plurality of projections, a concentrically arranged rotatable element within said first named element provided on its outer face with a different number of projections, a plurality of stationary cores spaced apart circumferentially arranged between said rotatable elements, and means for producing a magnetic flux in said cores, which flux is common to both elements.

10. An electro-magnetic apparatus for coupling together two elements so that they rotate at different speeds, comprising a rotatable cylinder, a plurality of projections on the inner face thereof, a rotatable element arranged concentrically within said cylinder and spaced apart therefrom, a different number of projections on the outer face thereof of equal thickness circumferentially, a plurality of stationary cores arranged between said rotatable elements having their inner faces concentric with the inner rotatable element and of substantially the same thickness as the projections thereon, and means for producing a magnetic flux in said cores.

11. An electro-magnetic apparatus for coupling together two elements so that they rotate at different speeds, comprising a rotatable cylinder, a plurality of projections of regular size and spacing on the inner face thereof, a rotatable element arranged within the cylinder, a different number of projections of regular size and spacing on the outer face thereof, and a plurality of magnetic cores spaced apart circumferentially between said rotatable elements, the inner faces of said cores corresponding to the teeth on the inner element and the outer face of said cores corresponding to the teeth on the outer element.

12. An electro-magnetic apparatus for coupling together two elements so that they rotate at different speeds, comprising a rotatable cylinder provided on its inner face with regular projections, a rotatable element arranged within and concentric therewith provided on its outer face with a different number of regular projections, stationary cores arranged between said rotatable elements spaced apart circumferentially a distance equal to substantially one-half the thickness of the projections on the inner element, and magnetizing windings surrounding said cores.

13. An electro-magnetic apparatus for coupling together two elements so that they rotate at different speeds, comprising a rotatable cylinder, a plurality of regular projections on the inner face thereof, a rotatable element arranged therein and concentric therewith, a different number of regular projections on the outer face thereof, stationary cores arranged between said rotatable elements, said cores being spaced apart circumferentially a distance equal to one-half the thickness of the projections on the inner element and having an inner face corresponding to the face of the projections on the inner element, and an outer face corresponding to the inner face of the cylinder, and magnetizing windings surrounding said cores.

14. An electro-magnetic apparatus for coupling together two elements so that they rotate at different speeds, comprising a rotatable cylinder, a plurality of regular projections on the inner face thereof, a rotatable element arranged within said cylinder, concentric therewith and spaced apart therefrom, a different number of regular projections on the outer face thereof, a plurality of normally stationary cores arranged diametrically in pairs between said rotatable elements and spaced apart transversely, the inner faces of said cores corresponding to the outer face of the inner element, a plurality of projections on the outer faces of said cores of the same size as the projections on the cylinder, and magnetizing windings surrounding the alternate cores.

15. An electro-magnetic apparatus for coupling together two elements so that they rotate at different speeds, comprising a rotatable cylinder, a plurality of regularly spaced projections on the inner face thereof, a rotatable element arranged concentrically within said cylinder and spaced apart therefrom, a different number of projections on the outer face thereof, a plurality of normally fixed cores spaced apart circumferentially and arranged diametrically in pairs between said rotatable elements, a plurality of projections on the outer face of each core of the same size and spacing as the projections on the cylinder, the projections on the cores being so placed with relation to the projections on the cylinder that when the projections on one core are alined with the projections on the cylinder, the projections on the opposite core are staggered with relation to the projections on the cylinder, and magnetizing windings surrounding said cores.

16. A magnetically operated power transmitting apparatus, comprising a rotatable element having a regularly mutilated face, a second rotatable element arranged adjacent thereto having a regularly mutilated face, and a plurality of stationary magnetic conductors arranged between said faces and having correspondingly mutilated faces, the faces of the alternate conductors adjacent to one rotatable element being movable circumferentially.

17. A magnetically operated power transmitting apparatus comprising a rotatable element, a plurality of regularly spaced projections thereon, a second rotatable element, a plurality of regularly spaced projections thereon, a plurality of normally stationary magnetic conductors extending from adjacent the face of one element to adjacent the face of the other, the faces of said conductors adjacent the elements being provided with corresponding projections, said faces being spaced apart circumferentially, the alternate faces at one element being movable circumferentially with respect to said element, and means for establishing a magnetic flux in said conductors.

18. A magnetically operated power transmitting apparatus comprising two rotatable elements each having regularly mutilated faces and a fixed structure comprising a plurality of magnetic conductors having similarly mutilated opposite faces arranged adjacent the faces of said elements.

19. A magnetically operated power transmitting apparatus comprising two rotatable elements, a plurality of cores spaced apart from each other by air gaps arranged diametrically in pairs between the moving surfaces of said elements, and means for establishing a magnetic flux in said cores.

20. An electro-magnetic power transmitting apparatus comprising a rotatable element, a plurality of regularly spaced projections thereon, a second rotatable element, a plurality of regularly spaced projections thereon, a plurality of stationary magnetic conductors extending from adjacent the face of one element to adjacent the face of the other element, said conductors being arranged in pairs, the faces of each pair at each element being arranged diametrically opposite, projections on said faces corresponding to the projections on the adjacent elements, and means for establishing a magnetic flux in said conductors.

21. An electro-magnetic power transmitting apparatus comprising a rotatable cylinder, a plurality of regular projections on the inner face thereof, a rotatable element arranged within said cylinder, concentric therewith and spaced apart therefrom, a plurality of regular projections on the periphery of said element, a plurality of normally stationary cores arranged between said elements, said cores being arranged diametrically in pairs, a plurality of projections on the outer faces of said cores corresponding to the projections on the cylinder, said projections being arranged so that when the projections on one core coincide with the projections on the cylinder the projections on the diametrically opposite core are staggered with respect to the projections on the cylinder, a plurality of projections on the inner faces of said cores corresponding to the projections on the rotatable element, said projections being arranged so that when the projections on one core coincide with the projections on the rotatable element, the projections on the diametrically opposite core are staggered with respect to the projections on the rotating element, and means for producing oppositely directed magnetic fluxes in the successive cores.

22. An electro-magnetic power transmitting apparatus comprising a rotatable cylinder, a plurality of regular projections on the inner face thereof, a rotatable element arranged within said cylinder spaced apart therefrom, a plurality of regular projections on the periphery of said element, a plurality of normally stationary cores arranged between said elements, said cores being arranged diametrically in pairs and having opposite faces concentric with the faces of the rotatable elements with which they are in juxtaposition, a plurality of projections on the outer face of said cores corresponding to the projections on the cylinder, said core projections being arranged so that when the projections on one core coincide with the projections on the cylinder, the projections on the next core are in half coincidence with the projections on the cylinder, a plurality of projections on the inner faces of said cores corresponding to the projections on the rotatable element, said core projections being arranged so that when the projections on one core coincide with the projections on the element, the projections on the next core are in half coincidence with the projections on the element, and means for producing similarly directed magnetic fluxes in the alternate cores.

23. An electro-magnetic apparatus for transmitting power between two non-alined shafts, comprising an element secured to one of said shafts, a plurality of regularly spaced projections on said element, a second element secured to the other shaft, a plurality of regularly spaced projections on said second element, a plurality of stationary magnetic conductors connecting said elements magnetically, said conductors being provided on one end with faces corresponding to and lying adjacent the projections on the first element, and on the other end with faces corresponding to and adjacent the projections on the second element, and reversely wound current carrying coils surrounding the successive conductors.

24. An electro-magnetic apparatus for transmitting power between two rotatable shafts, comprising a disk secured to one of said shafts, a plurality of regular projections on the inner face of said disk, a second disk secured to the second shaft, a plurality of regular projections on the inner face of said disk, a plurality of stationary cores spaced apart circumferentially arranged between said disks, the opposite faces of the cores being provided with projections corresponding to the disk to which they lie adjacent, and magnetizing windings surrounding said cores.

In testimony whereof, I have hereunto set my hand at San Francisco, California, this 13th day of March 1913.

ALFONS H. NEULAND.

In presence of—
H. G. PROST,
M. LE CONTE.